United States Patent
Jia et al.

(10) Patent No.: US 11,171,522 B2
(45) Date of Patent: Nov. 9, 2021

(54) WIRELESS CHARGING EFFICIENCY

(71) Applicant: Google LLC, Mountain View, CA (US)

(72) Inventors: Liang Jia, Palo Alto, CA (US); Qi Tian, San Jose, CA (US); Liyu Yang, San Jose, CA (US); Veera Venkata Siva Nagesh Polu, Mountain View, CA (US); Srikanth Lakshmikanthan, Milpitas, CA (US); Rahul Apte, San Francisco, CA (US); Jae-won Hwang, Menlo Park, CA (US); Srenik Suresh Mehta, Fremont, CA (US)

(73) Assignee: Google LLC, Mountain View, CA (US)

( * ) Notice: Subject to any disclaimer, the term of this patent is extended or adjusted under 35 U.S.C. 154(b) by 252 days.

(21) Appl. No.: 16/393,526

(22) Filed: Apr. 24, 2019

(65) Prior Publication Data

US 2020/0343777 A1    Oct. 29, 2020

(51) Int. Cl.
| | |
|---|---|
| *H02J 50/10* | (2016.01) |
| *H02J 50/90* | (2016.01) |
| *H02J 7/00* | (2006.01) |
| *H02J 7/02* | (2016.01) |
| *H02J 7/04* | (2006.01) |

(52) U.S. Cl.
CPC ........ *H02J 50/90* (2016.02); *H02J 7/007192* (2020.01); *H02J 7/025* (2013.01); *H02J 7/045* (2013.01); *H02J 50/10* (2016.02)

(58) Field of Classification Search
CPC ...... H02J 50/90; H02J 50/10; H02J 7/007192; H02J 7/025; H02J 7/045; H02J 50/12
See application file for complete search history.

(56) References Cited

U.S. PATENT DOCUMENTS

| | | | |
|---|---|---|---|
| 6,917,182 B2 | 7/2005 | Burton et al. | |
| 8,338,991 B2 | 12/2012 | Von Novak et al. | |
| 8,667,452 B2 | 3/2014 | Verghese et al. | |
| 8,803,474 B2 | 8/2014 | Hillan et al. | |

(Continued)

FOREIGN PATENT DOCUMENTS

| | | |
|---|---|---|
| CN | 103354376 | 10/2013 |
| WO | WO 2017/033192 | 3/2017 |

OTHER PUBLICATIONS

PCT International Search Report and Written Opinion in International Appln. No. PCT/US2019/066911, dated Mar. 19, 2020, 9 pages.

(Continued)

*Primary Examiner* — Nghia M Doan
(74) *Attorney, Agent, or Firm* — Fish & Richardson P.C.

(57) ABSTRACT

Methods, systems, and apparatus, including computer programs encoded on computer-storage media, for improving wireless charging. In some implementations, an electronic device determines a power demand of the electronic device. The electronic device includes a wireless power receiver including a wireless power receiving coil configured to receive power through inductive coupling with a wireless charge. The electronic device determines an operating voltage or operating frequency for the wireless charger based on the power demand of the electronic device. The electronic device sends, to the wireless charger, data indicating the operating voltage or operating frequency for the wireless charger.

20 Claims, 7 Drawing Sheets

(56) References Cited

U.S. PATENT DOCUMENTS

| | | | |
|---|---|---|---|
| 9,379,573 B2 | 6/2016 | Byun et al. | |
| 9,857,821 B2 | 1/2018 | Kurs et al. | |
| 9,876,378 B2 | 1/2018 | Byun et al. | |
| 9,887,739 B2 | 2/2018 | Leabman et al. | |
| 10,218,206 B2* | 2/2019 | Lee | H02J 50/10 |
| 10,454,308 B2* | 10/2019 | Kwon | H02J 50/12 |
| 2008/0079392 A1* | 4/2008 | Baarman | H02J 7/025 |
| | | | 320/108 |
| 2010/0259215 A1 | 10/2010 | Sip | |
| 2013/0099734 A1* | 4/2013 | Lee | H02J 7/007 |
| | | | 320/108 |
| 2013/0127410 A1* | 5/2013 | Park | H02J 7/0069 |
| | | | 320/108 |
| 2014/0015330 A1* | 1/2014 | Byun | H02J 5/005 |
| | | | 307/104 |
| 2018/0226829 A1 | 8/2018 | Bae et al. | |
| 2019/0027969 A1 | 1/2019 | Starting et al. | |

OTHER PUBLICATIONS

Wikipedia.com[online], "Qi (standard)," Apr. 2019, [retrieved on Apr. 24, 2019], retrieved from: URL<https://en.wikipedia.org/wiki/Qi_(standard)>, 5 pages.

Wikipedia.com[online], "Inductive Charging," Apr. 2019, [retrieved on Apr. 24, 2019], retrieved from: URL<https://en.wikipedia.org/wild/Inductive_charging>, 9 pages.

Wikipedia.com[online], "Resonant Inductive Coupling," Nov. 2018, [retrieved on Apr. 24, 2019], retrieved from: URL<https://en.wikipedia.org/wiki/Resonant_inductive_coupling>, 7 pages.

\* cited by examiner

WIRELESS CHARGING EFFICIENCY

BACKGROUND

The present specification relates to improving wireless charging efficiency.

Many mobile devices and other battery-powered devices need to receive energy for general operation and to charge their batteries. Energy can be transferred wirelessly using electromagnetic coupling between a power transmitter and a power receiver.

SUMMARY

In some implementations, a wireless charger and an electronic device to receive power can cooperate to adaptively control the operating points for wireless charging. For example, to achieve high power transfer efficiency, the input voltage to a wireless power transmitter of the charger can be adjusted, and the output voltage from a wireless power receiver of the electronic device can be adjusted. The voltages can be dynamically adjusted as power transfer needs change. In some cases, efficiency can be improved by adjusting other parameters, such as the frequency of power transmission. By cooperating to change the operating points, the charger and electronic device can select and apply combinations of operating parameters that allow high efficiency, low production of waste heat, and high charging speed. In some implementations, the parameters can be set so that charging proceeds at a point that is on or near an optimal efficiency envelope, as discussed further below.

To determine appropriate operating parameters for wireless charging, charger profile data indicating characteristics of a charger can be generated and stored, for example, as a model, an equation, a table, a set of curves, or in another form. When a device is charged using the charger, the device and/or the charger can use the charger profile data to determine the set of operating parameters that would provide high efficiency given the level of power transfer that is needed. As the power demand changes, the device and charger can adjust the operating parameters to achieve high efficiency at different power levels. For example, when 6 W of power are needed, an input voltage to the wireless transmitter may be set at 9V and an output voltage of the wireless receiver may be set at 9V. When 10 W of power are needed, an input voltage to the wireless transmitter may be set at 12V and an output voltage of the wireless receiver may be set at 12V. Thus, the voltages and potentially other parameters can be varied to achieve the highest efficiency available for the desired power transfer level.

The charger and charged device can also set operating parameters to achieve high efficiency when charger profile data is not available or when charger characteristics are not known. For example, an initial set of operating parameters can be used, and an efficiency measure can be calculated to indicate the current level of efficiency. Periodically, operating parameters can be changed and efficiency re-calculated. For example, voltage of the wireless power transmitter and voltage of the wireless power receiver can be gradually or incrementally increased. While the efficiency measures show increases in efficiency, the system may continue to step up voltages in this manner. Once efficiency begins to decrease, however, the system can stop incrementing voltage and use one of the high efficiency settings discovered through incremental adjustment of the parameters.

In a general aspect, a method includes: determining, by an electronic device, a power demand of the electronic device, wherein the electronic device includes a wireless power receiver including a wireless power receiving coil configured to receive power through inductive coupling with a wireless charger; determining, by the electronic device, an operating voltage or operating frequency for the wireless charger based on the power demand of the electronic device; and sending, by the electronic device and to the wireless charger, data indicating the operating voltage or operating frequency for the wireless charger.

Implementations can include one or more of the following features. For example, in some implementations, the method includes: determining, based on the power demand of the electronic device, an operating voltage or operating frequency for the wireless power receiver of the electronic device; and setting the wireless power receiver to use the determined operating voltage or operating frequency for the wireless power receiver of the electronic device.

In some implementations: determining the operating voltage or operating frequency for the wireless charger comprises determining an operating voltage for the wireless charger; wherein the operating voltage for the wireless charger is an input voltage provided to a wireless power transmitter of the wireless charger; wherein determining the operating voltage or operating frequency for the wireless power receiver comprises determining an operating voltage for the wireless power receiver; and wherein the operating voltage for the wireless power receiver is an output voltage of the wireless power receiver of the electronic device.

In some implementations: determining the operating voltage or operating frequency comprises determining an operating voltage for the wireless charger; and the operating voltage for the wireless charger is a voltage that a driver circuit of the wireless charger uses to generate excitation pulses that drive a power transmission coil of the wireless charger.

In some implementations, the method includes sending, by the electronic device, data indicating the power demand of the electronic device to the wireless charger.

In some implementations, determining the power demand comprises determining a first amount of power for operation of the electronic device and determining a second amount of power for charging of a battery of the electronic device, where the power demand is a combination of the first amount and the second amount.

In some implementations, the electronic device is configured to communicate with the wireless charger by sending data over an inductive coupling used to provide power from the wireless charger to the electronic device.

In some implementations, the method includes receiving, from the wireless charger, identifying data for the wireless charger; and accessing charger profile data corresponding to the wireless charger based on the identifying data, the charger profile data indicating characteristics of the wireless charger for different power transmission levels. Determining the operating voltage or operating frequency for the wireless charger comprises determining, based on the charger profile data, an operating voltage or operating frequency corresponding to the power demand of the electronic device.

In some implementations, accessing the charger profile data comprises selecting the charger profile data corresponding to the charger from among multiple different sets of charger profile data stored at the electronic device, where each of the different sets of charger profile data indicates characteristics of a different wireless charger.

In some implementations, the charger profile data comprises a data model, a table, a mapping, an equation, or data for one or more curves, and the charger profile data indicates different operating voltages or operating frequencies of the wireless charger for different wireless charging power levels.

In some implementations, the charger profile data indicates an efficiency envelope across multiple wireless charging power levels. Determining the operating voltage or operating frequency for the wireless charger comprises determining, based on the charger profile data, the operating voltage or operating frequency to achieve an efficiency along the efficiency envelope indicated by the charger profile data.

In some implementations, determining the operating voltage or operating frequency comprises determining an operating voltage for the wireless charger. Determining the operating voltage comprises determining an operating voltage such that the operating voltage of the wireless charger and an operating voltage of a wireless power receiver of the electronic device have a ratio that is a predetermined value or within a predetermined range.

In some implementations, the ratio is between 1:1 to 1.2:1.

In some implementations, the method includes: determining that the power demand of the electronic device has changed or that a predetermined amount of time has elapsed; and in response to determining that the power demand of the electronic device has changed or that a predetermined amount of time has elapsed, determining a second operating voltage or operating frequency for the wireless charger and causing the electronic device to send, to the wireless charger, data indicating the second operating voltage or operating frequency for the wireless charger.

In some implementations, the method includes, after sending the data indicating the operating voltage or operating frequency for the wireless charger: performing one or more operating voltage adjustment cycles that each comprise: (i) receiving, from the wireless charger, data indicating one or more operating settings of the wireless charger; (ii) determining, based on the data indicating one or more operating settings of the wireless charger, an efficiency measure for power transfer between the wireless charger and the electronic device using a first operating voltage of the wireless charger; (iii) determining that the efficiency measure indicates a higher efficiency than a previously determined efficiency measure for operation of the wireless charger with an operating voltage lower than the first operating voltage; and (iv) based on determining that the efficiency measure indicates a higher efficiency than the previously determined efficiency measure, causing the electronic device to send, to the wireless charger, data indicating an operating voltage that is higher than the first operating voltage.

In some implementations, performing the one or more voltage adjustment cycles is performed in response to determining that the wireless charger is not identified by the electronic device or that charger profile data for the wireless charger is not available to the electronic device.

In some implementations, the method includes periodically performing the voltage adjustment cycles until determining that an efficiency measure for operating the wireless charger at a current operating voltage indicates an efficiency that is lower than the efficiency indicated by the efficiency measure for operating the wireless charger at an operating voltage of a previous voltage adjustment cycle.

In some implementations, the method includes iteratively adjusting the operating voltage or operating frequency for the wireless charger by performing adjustment cycles that each incrementally adjust the operating voltage or operating frequency used by the wireless charger, wherein the operating voltage or operating frequency is iteratively adjusted until the electronic device determines that an efficiency for power transfer between the wireless charger and the electronic device using a current operating voltage or operating frequency for the wireless charger is lower than an efficiency for power transfer between the wireless charger and the electronic device with a previous operating voltage or operating frequency for the wireless charger.

In some implementations, the method includes iteratively adjusting the operating voltage for the wireless charger by performing operating voltage adjustment cycles that each incrementally increase the operating voltage used by the wireless charger, wherein the operating voltage is iteratively adjusted until the electronic device determines that an efficiency for power transfer between the wireless charger and the electronic device using a current operating voltage for the wireless charger is lower than an efficiency for power transfer between the wireless charger and the electronic device with a lower operating voltage for the wireless charger.

In another general aspect, a method includes: receiving, by a wireless charger and from an electronic device to be charged by the wireless charger, data indicating a level of wireless power transfer requested by the electronic device; receiving, by the wireless charger, data from the electronic device indicating an operating voltage or operating frequency for the wireless charger; and communicating, by the wireless charger, with a power supply coupled to the wireless charger, to adjust a voltage provided by the power supply to the wireless charger or a frequency for power transmission based on the operating voltage or operating frequency indicated by the received data from the electronic device to be charged.

In another general aspect, a method includes receiving, by a wireless charger and from an electronic device to be charged by the wireless charger, data indicating a level of wireless power transfer requested by the electronic device; determining, based on the level of wireless power transfer requested, an input voltage for the wireless charger and an output voltage for a wireless power receiver of the electronic device; communicating, by the wireless charger, with a power supply coupled to the wireless charger, to adjust a voltage provided by the power supply to the wireless charger based on the input voltage for the wireless charger; and communicating, by the wireless charger, with the electronic device, to provide data indicating the output voltage for the wireless power receiver of the electronic device.

In another general aspect, a method includes receiving, by a wireless charger and from an electronic device to be charged by the wireless charger, data indicating a level of wireless power transfer requested by the electronic device; determining, based on the level of wireless power transfer requested, an operating frequency for the wireless charger; setting, by the wireless charger, the determined frequency for power transmission by the wireless charger; and communicating, by the wireless charger, with the electronic device, to provide data indicating the operating frequency.

In another general aspect, a method includes: determining, by an electronic device, a power demand of the electronic device, wherein the electronic device includes a wireless power receiver including a wireless power receiving coil configured to receive power through inductive coupling with a wireless charger; sending, by the electronic device and to the wireless charger, data indicating the power demand of the electronic device; receiving, by the electronic device and from the wireless charger, data indicating an operating voltage for the wireless power receiver of the electronic device; and setting, by the electronic device, an output voltage for the wireless power receiver based on the output voltage indicated by the data from the wireless charger.

In another general aspect, a method includes: determining, by an electronic device, a power demand of the electronic device, wherein the electronic device includes a wireless power receiver including a wireless power receiving coil configured to receive power through inductive coupling with a wireless charger; sending, by the electronic device and to the wireless charger, data indicating the power demand of the electronic device; receiving, by the electronic device and from the wireless charger, data indicating an operating frequency for wireless power transfer that was determined based on the power demand of the electronic device; and setting, by the electronic device, a frequency for the wireless power receiver based on the operating frequency indicated by the data from the wireless charger.

Implementations can provide one or more of the following advantages. For example, a wireless charger and a device receiving power can tune their operating parameters so that power transfer efficiency is improved for each of multiple power levels. Different settings can be used for different power transfer levels, taking into account the particular characteristics of the charger and device receiving power. By improving power transfer efficiency, less waste heat is generated in the charger and in the device receiving power. This can allow faster charging and higher effective rates of power transfer, because excess heat generation can require a device to lower power transfer rates to meet thermal constraints. When the electronic device being charged determines the most appropriate operating parameters to be used, the processing requirements of the charger are minimal, because the charger can simply act on the instructions or requests from the electronic device. The electronic device can store and obtain charger profile data indicating the characteristics of many different models of chargers. For example, the electronic device may store the charger profile for a charger among a set of charger profiles before charging is initiated. In addition, or as an alternative, the electronic device may be able to obtain charger profile data for a charger from the charger itself, from server system over a computer network, in a software update, or in another manner.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
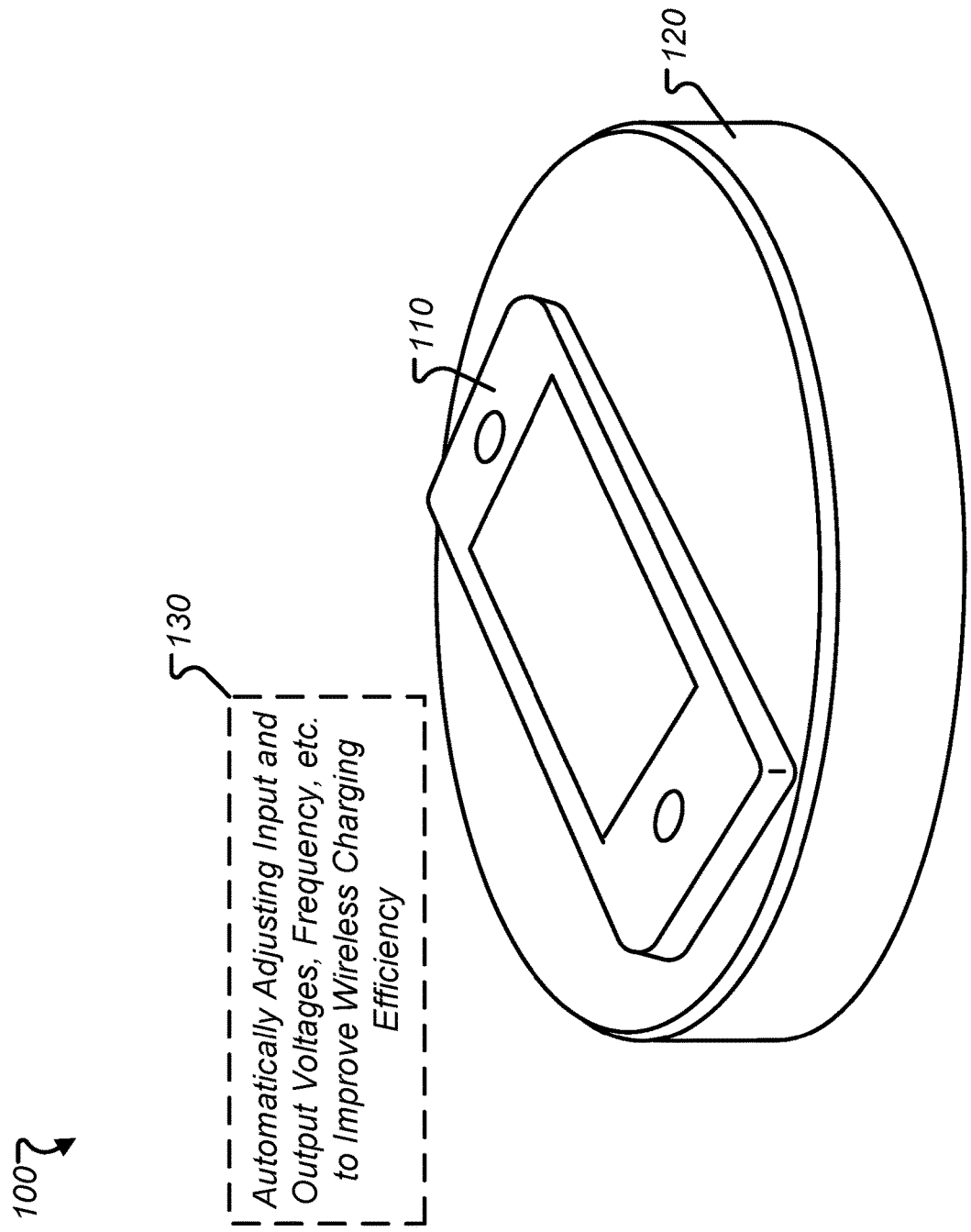
FIG. 1 is a diagram that illustrates an example of a wireless charging system that includes an electronic device and a wireless charger.

FIG. 1 is a diagram that illustrates an example of a wireless charging system 100 that includes an electronic device 110 and a wireless charger 120. The electronic device 110 is placed on the wireless charger 120 so that the wireless charger 120 can be used to transfer the power through electromagnetic coupling to the electronic device 110. For example, the system 110 may transfer power through inductive coupling or resonant inductive coupling. The electronic device 110 may be, for example, a cellphone, a tablet computer, a laptop computer, a wearable device, a set of headphones, or another battery-powered device. This wireless charging system 100 automatically adjusts the parameters used for wireless charging to improve the overall efficiency of power transfer. For example, as shown in operation 130, the electronic device 110 and the wireless charger cooperate to improve wireless charging efficiency by automatically adjusting (i) an input voltage to the power transmitter in the charger 120 and (ii) an output voltage of a wireless power receiver in the electronic device 110. In some implementations, other wireless charging parameters may be additionally or alternatively be adjusted, such as the frequency of excitation pulses applied to a wireless power transmission coil of the wireless charger 120. As discussed below, the charger 120 and the electronic device 110 can determine or adjust wireless charging parameters at various times, such as at the beginning of charging and/or when a level of demand for wireless power transfer changes.

The wireless charger 120 may be configured to operate using operating parameters supported by specifications of the Wireless Power Consortium (WPC), such as the Qi standards for wireless charging. For example, charging may be performed in a frequency range of 87 kHz to 205 kHz. Additionally or alternatively, the charger 120 may be configured to operate using parameters of other standards, such as the AirFuel standard or the Rezence standard. The examples discussed herein extend or enhance the operating modes of these standards with adjustments to improve efficiency, as discussed below. Further, the techniques disclosed herein can be used with voltages, currents, frequencies, power levels, communication protocols, and other parameters that may be different from those of the standards.

Figure 2A:
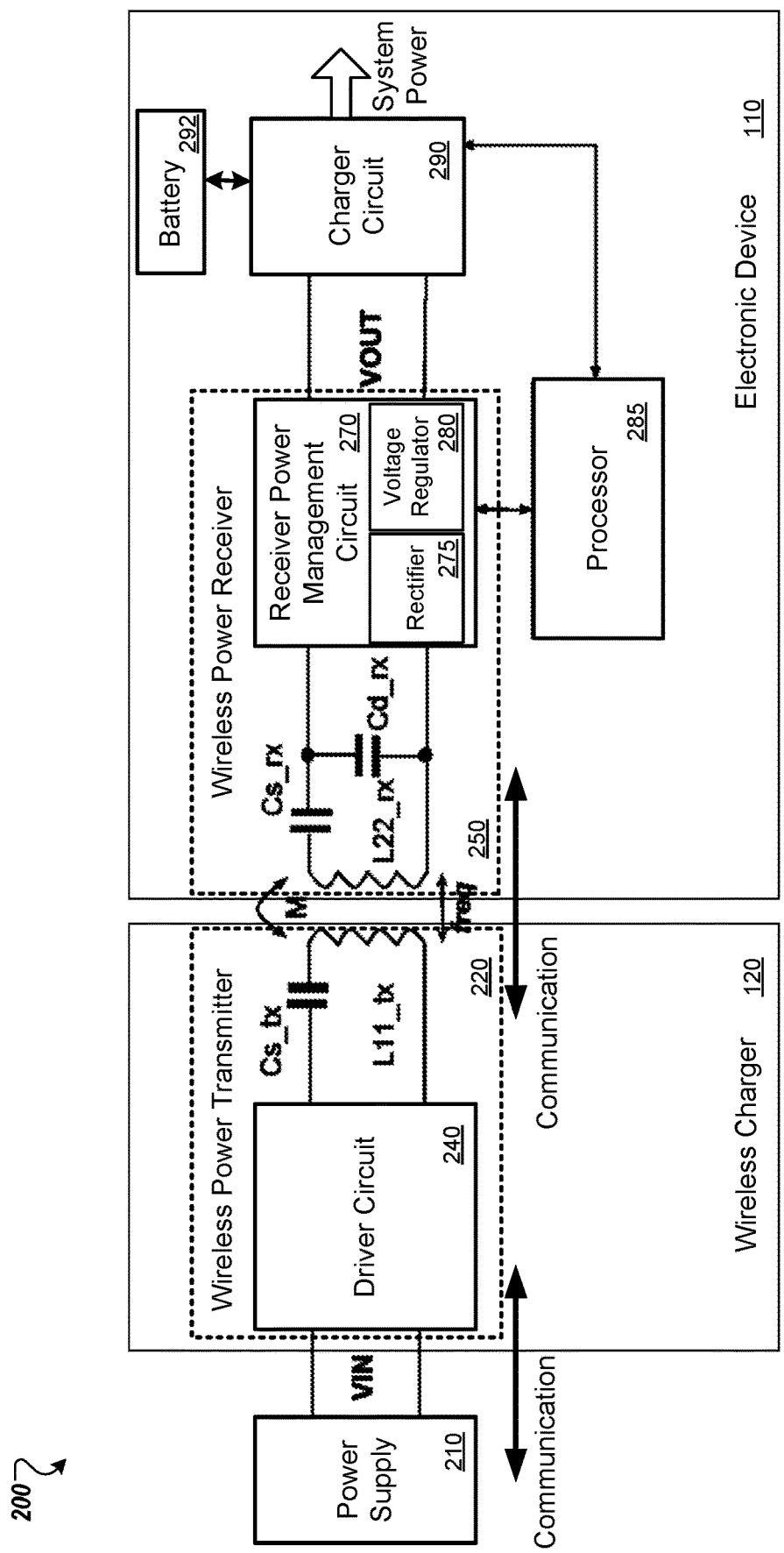
FIGS. 2A-2C are block diagrams that illustrate an example of a wireless charging system.
Figure 2B:
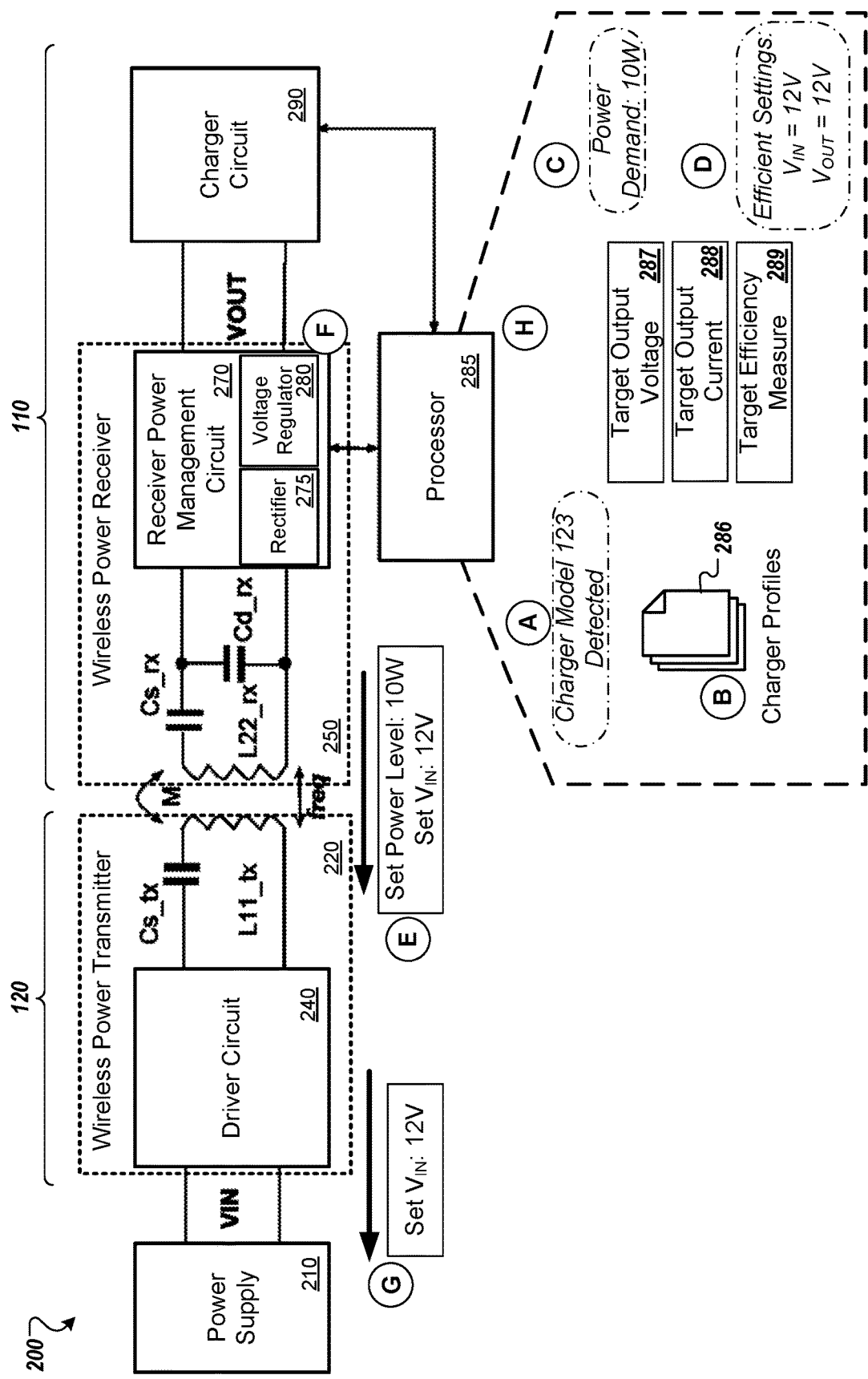
Figure 2C:
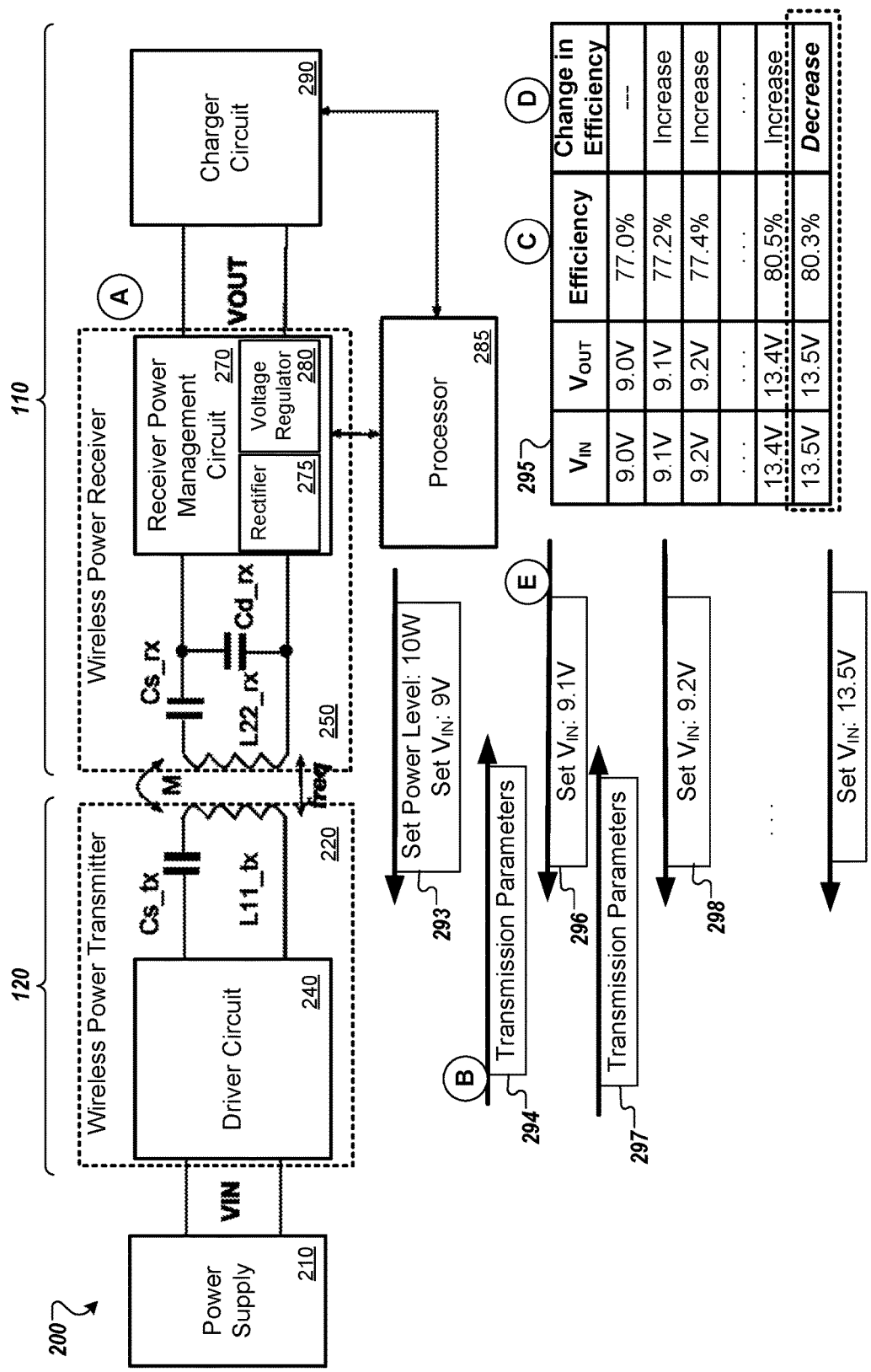

FIG. 2A is a block diagram that illustrates an example of a wireless charging system 200. FIGS. 2B and 2C illustrate various operations of the system 200 in further detail. The system 200 includes a power supply 210, the wireless charger 120, and the electronic device 110. Power is transferred wirelessly from the wireless charger 120 to the electronic device 110 using magnetic induction between receiver and transmitter coils. Positioning the receiver coil of the device 110 over the transmitter coil of the charger 120 allows for magnetic coupling when the transmitter coil is driven. Through this coupling, current flow and voltage are induced in the receiver coil. The output voltage of the receiver coil is then rectified and used by the electronic device 110, for example, to operate the device 110 and to charge a battery of the device 110.

In further detail, the power supply 210 is connected to a power source, such as an alternating current (AC) electrical outlet. The power supply 210 converts input power, such as an input AC voltage, to a DC voltage that serves as input to the wireless charger 120. In particular, the output of the power supply 210 can serve as the input voltage, $V_{IN}$, discussed further below. In some implementations, the power supply is programmable or otherwise adjustable to output different voltage levels in response to communication from the wireless charger 120. For example, the power supply 210 may include circuitry to receive, from the wireless charger 120, data requesting a particular voltage and then adjust its output voltage (e.g., the voltage $V_{IN}$) accordingly. For example, the power supply 210 may support just a few voltage levels, such as 5V, 9V, and 12V, or as another example may support a wider set of voltage levels, such as any voltage from 5V to 20V in increments of 1V, 0.5V, 0.1V, or 10 mV. In many instances, fine-grained increments may be used, such as increments of 20 mV. In some implementations, the power supply can operate according to the universal serial bus power delivery (USB-PD) specifications, which can involve 20 mV voltage steps for output voltage. Although the power supply 210 is illustrated as separate from the wireless charger 120, the power supply 210 may optionally be integrated with the wireless charger 120.

The wireless charger 120 includes a wireless power transmitter 220. The wireless power transmitter 220 includes a driver circuit 240, a capacitor Cs_tx, and a power transmission coil L11_tx. The driver circuit 240 receives the DC voltage $V_{IN}$ from the power supply 210 and generates a series of excitation pulses at a desired frequency. For example, the driver circuit 240 may be switching inverter driver that uses MOSFETs in a half-bridge or full-bridge topology. The excitation pulses are provided to the capacitor Cs_tx which is connected in series with the power transmitter coil L11_tx. The capacitor Cs_tx and the transmitter coil L11_tx form a resonant tank, and the excitation pulses cause an alternating magnetic field to be produced by the power transmitter coil L11_tx.

The electronic device 110 includes a wireless power receiver 250, a processor 285, a charger circuit 290, and a battery 292. Other components of the electronic device are not shown, but any appropriate devices may be included (e.g., input devices, output devices, screens, speakers, processors, etc.) and be powered by the battery and the wireless power receiver 250.

The wireless power receiver 250 includes a receiver power management circuit 270, a capacitor Cs_rx, a power receiver coil L22_rx, and a detection capacitor Cd_rx. The capacitor Cs_rx and the power receiver coil L22_rx form a resonant tank tuned to efficiently receive power at a frequency that is substantially the same as (e.g., typically within 5% or less) the frequency transmitted by the power transmitter 220. When the electronic device 110 is properly placed over the wireless charger 120 and the power transmitter coil L11_tx is activated, the power receiver coil L22_rx is inductively coupled with the power transmitter coil L11_tx so that the power receiver coil L22_rx receives power that is transmitted from the power transmitter coil L11_tx. The inductive coupling induces a voltage and current in the power receiver coil L22_rx that is provided to the receiver power management circuit 270. In the figure, the label M represents a coupling coefficient that depends on the placement of the power receiver coil L22_rx with respect to the transmitter coil L11_tx.

The receiver power management circuit 270 includes a rectifier 275 and a voltage regulator 280. The rectifier 275 converts AC voltage and current into DC voltage and current. The rectifier 275 may include a full-bridge rectifier or any appropriate circuit that provides rectification. For example, the rectifier may be a diode-based rectifier or a switching rectifier. The voltage regulator 280 receives the rectified DC output from the rectifier 275 and regulates it to a desired output DC voltage level. This regulated DC output, $V_{OUT}$, can be the output of the wireless power receiver 250. The voltage regulator 280 can be programmable or otherwise adjustable, so that the output voltage level $V_{OUT}$ that the voltage regulator provides can be dynamically adjusted. For example, in response to instructions from the processor 285, the receiver power management circuit 270 and its voltage regulator 280 can adjust the voltage $V_{OUT}$ to provide a desired output voltage to the charger circuit 290. The voltage regulator 280 may be any appropriate type of voltage regulator, such as a linear regulator or a switching regulator. The voltage regulator 280 may be configured as low dropout (LDO) regulator.

In the electronic device 110, the charger circuit 290 receives the power from the wireless power receiver 250 and converts it to an appropriate voltage and current to charge the battery 292. The charger circuit 290 or other circuitry of the electronic device 110 also uses power from the wireless power receiver 250 for general operation of the electronic device 110, e.g., the system load for power currently being consumed by the electronic device 110. Generally, the electronic device 110 is configured so that power from the wireless power receiver 250 can be used to power the system load and the battery charging load concurrently.

The processor 285 communicates with receiver power management circuit 270 and the charger circuit 290 to determine and set appropriate wireless charging parameters. For example, the processor 285 may be a central processing unit (CPU), a microcontroller, a field-programmable gate array (FPGA), or other circuitry. Though illustrated as a single element, the processor 285 may be implemented as multiple processors, and the functions of the processor 285 may be distributed among multiple different processors or circuits.

In the system 200, the wireless charger 120 and the electronic device 110 are configured to communicate with each other (e.g., data communication to exchange requests, acknowledgements, instructions, identifiers, power levels, voltage indications, efficiency indications, etc.). This communication can be bidirectional. In some implementations, the communication takes place over the inductive coupling between the power transmitter coil L11_tx and the power receiver coil L22_rx, in what can be referred to as "in-band" communications between the wireless power transmitter 226 and the wireless power receiver 250. The wireless charger 120 can transmit data over the inductive coupling using frequency shift keying (FSK), for example, modulating the frequency of excitation pulses used to drive the power transmitter coil L11_tx using the base frequency of power transmission as a carrier. These frequency variations can be detected and interpreted by the electronic device 110. The electronic device 110 can transmit data by varying the impedance presented by the wireless power receiver 250, for example, using amplitude shift keying (ASK). The changes in impedance can be detected by the wireless power transmitter 22, for example, as changed in reflected impedance. In this manner, the wireless charger 120 and the electronic device 110 can both send and receive data over the inductive coupling between the coils L11_tx, L22_rx. In some implementations, communication between the wireless charger 120 and the electronic device 110 can additionally or alternatively be achieved using communication channels separate from the inductive coupling, which can be referred to as "out of band" communications. For example, communication may occur over radio-frequency wireless communication protocols such as Wi-Fi or Bluetooth.

The communication between the wireless charger 120 and the electronic device 110 can be used to identify or verify compatibility of devices, to control of power levels, and to transmit other data discussed below, such as to negotiate operating voltages. For example, the electronic device 110 can provide data indicating a power demand to the wireless charger 120. The electronic device 110 can also provide data indicating one or more operating parameters for the wireless charger 120, such as a voltage to be used as the input voltage $V_{IN}$. The electronic device 110 can also receive data identifying the wireless charger 120 (e.g., an identifier for the model or type of charger), which can allow the electronic device 110 to verify authenticity and compatibility of the wireless charger 120 as well as determine appropriate settings for charging with the wireless charger 120.

As discussed below, operating parameters of the electronic device 110 and/or the wireless charger 120 can be adjusted to provide high efficiency of the system 200 as a whole, e.g., total efficiency from power input to the wireless power transmitter 220 to power output at the wireless power receiver 250. In some implementations, the electronic device 110 and the wireless charger 120 coordinate the appropriate levels for $V_{IN}$ and $V_{OUT}$ to achieve the highest efficiency possible for the total power demand by the electronic device 110 (e.g., power for battery charging, system operation, or both). In some implementations, other parameters may be adjusted, such as the switching frequency of the driver circuit 240, which may be tuned to change the power conversion gain and thus the output voltage.

FIG. 2B is a block diagram that illustrates an example of operations of the wireless charging system 200. The example of FIG. 2B shows how the electronic device 110 can determine operating parameters for wireless charging based on known characteristics of the wireless charger 120. The operation of the system 200 to establish operating parameters for charging is shown in a series of stages (A)-(H) that may occur in the order shown or in a different order.

The operations shown in FIG. 2B may occur when wireless power transfer is first initiated, as the electronic device 110 and the wireless charger 120 negotiate to establish appropriate operating parameters for wireless charging. As another example, the operations may occur as the electronic device 110 and the wireless charger 120 determine parameters for entering a high-power charging mode from a charging mode providing a lower amount of power or a default power level. Some or all of the steps may be repeated at other times, for example, in response to a change in power demand of the electronic device 110 or after a predetermined period of time has elapsed.

To enable highly efficient charging over a variety of power levels, characteristics of different wireless charger models can be determined and stored in charger profiles 286. In some implementations, an individual wireless charger model (or group of similar models) can have a corresponding charger profile 286. Each charger profile 286 can indicate different operating characteristics of the corresponding charger(s), including different input voltage levels, $V_{IN}$, that provide the highest efficiency for power transfer at different wireless power output levels. For example, the charger profile 286 for the charger 120 may indicate that for power output of 0 W up to 3.5 W, a $V_{IN}$ of 5V should be used; that for power output above 3.5 W up to 7 W a $V_{IN}$ of 9V should be used; that for power output above 7 W up to 11.5 W a $V_{IN}$ of 12V should be used; and that for power output above 11.5 W a $V_{IN}$ of 15V should be used. This information can be represented in any appropriate form or data structure, such as one or more data models, tables, files, mappings, equations, executable code segments, and so on. The charger profile data can indicate relationships between operating settings (e.g., voltages, frequencies, etc.) and power transfer levels that provide maximum efficiency achievable given the characteristics of the electronic device 110 and the wireless charger 120. For example, the charger profile data 286 can indicate parameters specifying operating points along the upper limits of a maximum efficiency envelope, where the efficiency is a total system efficiency from input to the power transmitter 220 to output of the wireless power receiver 250.

In some implementations, the inefficiency of or power expended by the charger circuit 290 can be considered in the model for an even more complete estimation of overall system efficiency. To account for this the charger profiles 286 representing the interaction characteristics of the electronic device 110 and different wireless chargers can incorporate information about the charger circuit 190. In some implementations, information characterizing the charger circuit 290 may be stored in a separate model or data set that is used with the charger profiles 286.

In addition, the charger profile 286 may reflect the capabilities of a charger and potentially also the power supply used with the charger. Thus, the charger profile 286 can indicate the operating modes supported by a charger and its power supply, such as a range of input voltages allowed, a range of power levels supported, a set of discrete input voltages that are selectable, an amount of a smallest increment of change permitted for $V_{IN}$ (e.g., changes by 1.0V, 0.1V, 0.01V, etc.). The charger profile 286 for a charger may also specifically indicate the capabilities and/or limitations of the charger, for example, indicating which of various operating modes or parameter ranges the charger can use.

In some implementations, the charger profiles 286 indicate not only characteristics of the wireless chargers but system-level characteristics resulting from the interaction of the particular electronic device 110 with different models or types of chargers. For example, two models of phones may have different shapes or types of power receiving coils, resulting in different inductive coupling characteristics. As a result, those two phone models may have differing charger profiles 286 for a single model of wireless charger, to account for the different ways that the two phones interact with that wireless charger. Thus, the charger profiles 286 stored by and used by the electronic device 110 may be tailored to reflect the specific coupling characteristics resulting from a particular model of electronic device 110 interacting with specific models of wireless chargers. Further, a charger profile 286 can indicate operating parameters and ranges of parameter for the wireless power receiver 250 of the electronic device 110, such as $V_{OUT}$, for different power transfer levels. For example, a charger profile 286 that the electronic device 110 stores can indicate different combinations of $V_{IN}$ and $V_{OUT}$ that provide the best efficiency for different power transfer levels, as well as potentially other parameters of the electronic device 110 and/or wireless charger 120.

In some implementations, the charger profiles 286 may be developed based on measurements of actual operating results measured for different device-charger pairs. In some implementations, the charger profiles 286 may be based at least in part on estimates or simulations of results of interactions between device-charger pairs.

The electronic device 110 can store various wireless charger profiles 286 in one or more storage devices of the electronic device 110, such as non-volatile storage. As a result, the charger profile 286 for the wireless charger 120

(as well as for other models and types of wireless chargers) may be present and available for use on the electronic device before the electronic device 110 is placed on wireless charger 120. In some implementations, charger profiles 286 may be obtained through various other channels, for example, from the wireless charger 120 or from a server system over a computer network.

Referring still to FIG. 2B, in stage (A), the electronic device 110 to receive power identifies a charger model or charger type for the wireless charger 120. This can take place, for example, at the beginning of wireless charging, as the electronic device 110 and the wireless charger 120 negotiate operating settings to initiate power transfer or to increase power transfer from an initial or default level to a higher power level. The electronic device 110 can receive identifying information for the wireless charger 120, such as a model identifier for the wireless charger 120. The identifying information may be provided automatically by the wireless charger 120 or may be provided in response to a request for the information from the electronic device. In the illustrated example, the processor 285 determines that the wireless charger 120 it is communicating with has a model of "Model 123."

In the illustrated example, the communication of identifying information for the wireless charger 120 (as with other communication discussed between the wireless charger 120 and the electronic device 110) occurs using "in-band" communication over the inductive coupling between the wireless charger 120 and the electronic device 110. Nevertheless, the communication may additionally or alternatively be achieved using "out-of-band" communication through a communication channel separate from the coupling of the power transmission coil L11_tx and the power receiver coil L22_rx.

In stage (B), the electronic device 110 selects a charger profile 286 that is appropriate for the identified model of wireless charger 120. In the example, the electronic device 110 stores multiple charger profiles 286 for different models of wireless chargers. Each of these can be associated with a model identifier or other identifying information to facilitate lookup. The processor 285 selects, from among the various charger profiles 286, the charger profile 286 that corresponds to the identified charger model, e.g., "Model 123." The charger profile 286 may indicate different operating voltages, e.g., $V_{IN}$ and $V_{OUT}$, that provide the highest efficiency for different power transfer levels.

The processor 285 can determine whether there is an available charger profile 286 for the identified model or type of wireless charger. If the electronic device 110 does not store an appropriate charger profile 286 for the current charger, the electronic device 110 may request and obtain one. In some implementations, the wireless charger 120 may store a charger profile and may provide it to the electronic device. In some implementations, the electronic device may obtain a charger profile over a computer network, such as over the Internet. If the electronic device 110 is unable to obtain an appropriate charger profile 286 for the wireless charger 120—or if the wireless charger 120 cannot be identified during stage (A)—then the electronic device 110 may use the techniques of FIG. 2C to determine operating parameters instead of the remaining techniques of FIG. 2B. When the charger profile 286 is available and identified, as in the example of FIG. 2B, the charger profile data is used to set operating parameters for the system 200 as discussed further below.

In stage (C), the electronic device 110 determines a power demand of the electronic device. For example, the processor 285 communicates with the charger circuit 290 and determines the total amount of power needed by the electronic device 110. This can include determining a system load, e.g., an amount of system power requested or currently being consumed by operation the device 110, as well as a charging load, e.g., an amount of power desired for charging the battery 292 of the device 110. The power demand can be a total of the system load and the charging load, up to a maximum level (e.g., a maximum power level of the wireless power receiver 250 or a maximum power level of the wireless power transmitter 220). In the example, the electronic device 110 determines that the power demand is 10 W.

In stage (D), the electronic device 110 uses the charger profile 286 for the wireless charger and the level of power demand of the electronic device 110 to determine operating parameters for wireless charging. For example, the processor 285 looks up the charging parameters that the selected charger profile 286 indicates are most efficient for delivering power at the current power demand, e.g., 10 W. Using the charger profile 286, the processor 285 determines (i) an input voltage, $V_{IN}$, to be provided to the wireless power transmitter 220 and (ii) an output voltage, $V_{OUT}$, to be provided by the wireless power receiver 250, in order to achieve the highest total power transfer efficiency. In the illustrated example, the processor 285 determines that the preferred operating parameters for a 10 W power transfer are an input voltage, $V_{IN}$, of 12V and an output voltage, $V_{OUT}$, of 12V.

The charger profile 286 may be used in different ways depending on how the charger profile data is stored. For example, the charger profile data may be expressed as a table, with entries representing different power levels and corresponding operating parameters (e.g., values of $V_{IN}$ and $V_{OUT}$). This allows the processor 285 to identify the table entry with the power level closed to the current power demand and use the operating parameters for that entry. As another example, the charger profile data may include one or more equations or functions that the processor 285 can use to calculate operating parameter values based on the power demand. As another example, the charger profile data may include data specifying efficiency curves indicating the efficiency of using different voltage levels at different power levels, and the processor 285 can determine, for the current power demand, which curve and thus which voltage level provides the highest efficiency. As another example, the charger profile data can specify a maximum efficiency envelope across different power levels, so that the processor 285 can determine a point along the maximum efficiency envelope and select operating parameters corresponding to that point. Other types of charger profile data, such as classifiers, machine learning models, and so on may additionally or alternatively be used.

For many charger and device combinations, the highest total efficiency for transfer is achieved at a particular ratio of $V_{IN}$ to $V_{OUT}$, or in a particular range of ratios of $V_{IN}$ to $V_{OUT}$. For example, the highest efficiency may be achieved at a ratio of 1:1. As another example, the highest efficiency may be achieved at a ratio between 1:1 to 1.2:1 depending on various conditions. The charger profiles 286 may indicate desired ratios and/or voltage levels and the electronic device 110 may use them to set operating parameters, or the charger profiles 286 may in some implementations simply specify parameter values consistent with these ratios.

In addition, for many charger and device combinations, highest efficiency may be reached when current levels are about 0.3 A to 1.5 A. The most efficient current levels may vary for different devices and power levels, but may be approximately 1 A in some circumstances. In many instances, the most efficient charging settings place the $V_{IN}$ and $V_{OUT}$ voltages at a level between 1× and 3× the power transfer level in watts. For example, if for a certain combination of device and charger a multiplier of 1.5 times the power level provides high efficiency, for a 6 W power transfer, $V_{IN}$ and $V_{OUT}$ may be set at 9V, for an 8 W power level $V_{IN}$ and $V_{OUT}$ may be set at 12V, and so on.

In some implementations, the electronic device 110 determines the ability of the wireless charger 120 and/or the power supply 210 for $V_{IN}$ adjustment. Some wireless chargers 120 and power supplies 210 may allow for continuous adjustment (e.g., any voltage in a range), fine-grained adjustment (e.g., with voltage steps of 0.1V, 0.5V, etc.), others may only allow coarse adjustment (e.g., with voltage steps of 1.0V, 2.0V, etc.), and others may allow only certain predetermined operating modes (e.g., 5V, 9V, and 12V). Similarly, different power levels may be supported. This information may be included the charger profile 286 for a charger. However, since a wireless charger 120 may use different power supplies 210 at different times (e.g., a USB port, a dedicated AC/DC adapter, etc.), the capabilities may vary at different times. Accordingly, the type or capabilities of the power supply 210 and/or wireless charger 120 may be obtained by the electronic device 110 through communication with the wireless charger 120. With this information, the processor 285 may adjust the operating parameters that are selected, for example, setting $V_{IN}$ and $V_{OUT}$ to the supported level that is closest to the efficient level calculated using the charger profile 286.

In stage (E), the electronic device 110 sends, to the wireless charger 120, data indicating the calculated operating parameters for the wireless charger 120. For example, the electronic device 110 sends an indication of the power demand of the electronic device 110 as well as an indication of the input voltage, $V_{IN}$, to be used for input to the wireless charger 120. In the example, the processor 285 causes the wireless power receiver 250 to send an indication of the requested power level, for example, 10 W. Optionally, the electronic device 110 may send data indicating other operating parameters for the wireless charger 120, such as a frequency for driving the transmitter coil L11_tx, which can adjust the gain of the inductive coupling and thus adjust the power transfer to increase efficiency. In some cases, operating parameters for the electronic device 110 (e.g., the $V_{OUT}$ used) may be sent, in case the wireless charger sets parameters based on parameters used by the electronic device 110.

The electronic device 110 may indicate the operating parameters to the wireless charger 120 in any of various different forms. As an example, specific values of power levels or operating voltages may be provided. The values may be indicated in absolute terms (e.g., 12V) or in relative terms (e.g., increase voltage by 3V, or increase voltage by 30%). As another example, the electronic device 110 may send a code that corresponds to an operating mode or parameter of the wireless charger 120, such as a code "1" to represent operation at $V_{IN}$ of 5V, a code "2" to represent operation at $V_{IN}$ of 9V, and so on for different supported operating modes or supported operating parameters of the wireless charger 120. The operating modes and corresponding codes, as well as communication protocol information, may be stored in and retrieved from the charger profile 286 for a charger.

In stage (F), electronic device 110 sets the operating parameters of the wireless power receiver 250 to the settings determined in stage (D). For example, the processor 285 sends instructions for the receiver power management circuit 270 to set the voltage regulator 280 to the determined output voltage level, for example, setting $V_{OUT}$ at 12V. By determining and setting operating parameters for both the electronic device 110 and the wireless charger 120, the system 200 can enhance the overall efficiency of power transfer for both the wireless power transmitter 220 and the wireless power receiver 250. This can ensure that the settings are coordinated or aligned. This can allow improved charging speeds and avoid excess heat production or excess temperatures in the wireless power transmitter 220 and the wireless power receiver 250 which could otherwise require lower power transfer levels and slower charging speeds.

In stage (G), the wireless charger 120 communicates with power supply 210 to adjust the input voltage, $V_{IN}$, that the power supply 210 provides to the wireless power transmitter 220. In the illustrated example, the wireless charger instructs the power supply 210 to set the input voltage, $V_{IN}$ at 12V as indicated by the communication from the electronic device 110.

In some implementations, the wireless charger 120 can provide acknowledgements to the electronic device 110, for example, to acknowledge receipt of data and/or to confirm that requested operating parameters have been set. For example, a response may be provided after receiving the data indicating the power level and operating voltage level in stage (E), or after adjusting the operating voltage level in stage (G). The wireless charger 120 can indicate the actual value of $V_{IN}$ or other operating parameters used, especially if the power supply 210 or wireless charger 120 is not able to support the specified power level or operating voltage requested by the electronic device 110. This can allow the electronic device 110 to adjust its settings accordingly, such as to decrease battery charging power if the wireless charger 120 is unable to supply the full amount of power requested.

Similarly, if the wireless charger is not able to support the input voltage, $V_{IN}$, specified by the electronic device 110, then the electronic device 110 can adjust the output voltage, $V_{OUT}$, to a desired level based on the actual level of $V_{IN}$ used. This can avoid a mismatch between the $V_{IN}$ and $V_{OUT}$ levels that could negatively affect efficiency. For example, if the power supply 210 has a maximum voltage output of 9V, and so cannot provide the desired 12V for highest efficiency, the electronic device 110 can use information indicating the 9V $V_{IN}$ and lower the voltage $V_{OUT}$ to 9V. As discussed above, for many charger and device combinations, the highest total efficiency for transfer is achieved at a particular ratio of $V_{IN}$ to $V_{OUT}$, or in a particular range of ratios of $V_{IN}$ to $V_{OUT}$. For example, the highest efficiency may be achieved at a ratio of 1:1. As another example, the highest efficiency may be achieved at a ratio between 1:1 to 1.2:1 depending on conditions.

In stage (H), the electronic device 110 monitors the power demand of the electronic device 110. The processor 285 can perform this monitoring on an ongoing basis as charging proceeds. The electronic device 110 can dynamically determine new operating parameters, including voltages $V_{IN}$ and $V_{OUT}$, during charging. If the processor 285 determines the total power demand (e.g., system load and/or battery charging load) changes, e.g., by at least a predetermined minimum amount, the processor 285 can cause the operating parameters for wireless charging to be determined and set again using the operations of stages (C) to (G) to achieve high efficiency at the new level of power demand.

In some implementations, the processor 285 recalculates power demand and wireless charging settings using the operations of stages (C) to (G) periodically, for example, at a predetermined rate such as every 5 seconds, 10 seconds, 30 seconds, every minute, every 10 minutes, etc.

In some implementations, the electronic device 110 adjusts the operating parameters when a predetermined event or condition is detected, such as the output voltage $V_{OUT}$ dropping below the target output voltage level, or system power load changing by at least a predetermined minimum amount. In response to the detected event or condition, the wireless charging system 200 can repeat some or all of the operations of stages (C) to (G). To facilitate the detection of events and conditions, the electronic device 110 can store a number of values for assessing the current conditions of wireless charging, such as: a target output voltage 287, e.g., the desired level of $V_{OUT}$, which is 12V in the example; a target output current 288, and a target efficiency measure 289. If the actual output voltage, output current, or efficiency are determined to deviate from the target levels (e.g., by more than a predetermined amount) the processor 285 can reevaluate the operating parameters for wireless charging.

In the example of FIG. 2B, the electronic device 110 determines the operating parameters, including voltages $V_{IN}$ and $V_{OUT}$, that affect operation of both the electronic device 110 and the wireless charger 120. This is beneficial in many instances, since electronic devices such as phones and portable computers often have memory and processing capabilities that exceed those of many chargers. This also allows the electronic device 110 to operate efficiently with a wide variety of chargers, and even to operate with future charger designs by obtaining new charger profiles 286. Similarly, it allows the wireless charger 120 to include relatively simple processing logic, keeping cost and complexity of the charger. Nevertheless, other arrangements can be used. For example, in some implementations, the roles may be reversed and the wireless charger 120 may determine operating parameters, such as voltages $V_{IN}$ and $V_{OUT}$, and may communicate a preferred $V_{OUT}$ level to the electronic device. For example, the wireless charger 120 may store one or more charger profiles, receive data indicating a model identifier or capabilities of the electronic device 110, receive data indicating the power demand of the electronic device 110. Then, the wireless charger 120 may use a stored charger profile to determine a voltage $V_{OUT}$ for the electronic device 110 to use and send data indicating that voltage. In other implementations, determining operating parameters may be obtained by sharing the processing among the electronic device 110 and the wireless charger 120, for example, through further negotiation and exchange of messages between them.

In some circumstances, the electronic device 110 may determine that the charger not identifiable or does not have a charger profile 286. In these cases, the electronic device 110 may use the technique discussed with respect to FIG. 2C to determine and set operating parameters to achieve high efficiency.

FIG. 2C is a block diagram that illustrates an example of operations of the wireless charging system 200. The illustrated example shows techniques that can be used to determine operating parameters for efficient wireless charging without a charger profile 286. For example, the techniques can be used when the electronic device 110 does not recognize the type of charger 120 being used, or if there is no charger profile 286 for the wireless charger 120 available to the electronic device 110. Various operations are shown in stages (A)-(E), which may performed in the order indicated or in another order.

Wireless charging can initially begin with a default set of operating parameters, for example, a default or low-power charging mode that is appropriate for a large number of devices. The electronic device 110 may obtain information from the wireless charger 120 indicating capabilities of the wireless charger 120 and/or the power supply 210, to determine the operating modes and voltage levels that are available to be used.

The electronic device 110 may instruct the wireless charger 120 to use a set of basic or safe operating parameters, even if they are not the most efficient. For example, the electronic device 110 may instruct the wireless charger 120 to use an input voltage $V_{IN}$ that is usually lower than optimal. In the example, the electronic device 110 sends a message 293 instructing the wireless charger to use an input voltage $V_{IN}$ of 9V and a power level of 10 W. Then, the electronic device 110 may perform various parameter adjustment cycles, discussed below in stages (A)-(E), to increase the input voltage $V_{IN}$ until a high efficiency is achieved, e.g., an efficiency that is approximately optimal given the charging conditions.

In stage (A), the electronic device 110 obtains data indicating the current settings of the wireless power receiver 250. For example, the processor communicates with the receiver power management circuit 270 to determine parameters such as (i) the output voltage $V_{OUT}$ of the wireless power receiver 250 currently provided and (ii) the amount of output power or output current from the wireless power receiver 250.

In stage (B), the electronic device 110 obtains data indicating current settings of the wireless power transmitter 220 of the wireless charger 120. For example, the electronic device 110 may send a request for these settings or they may be automatically provided by the wireless charger 120. The wireless charger 120 sends a message 294 that indicates settings used by the wireless charger, such as (i) the value of the input voltage $V_{IN}$ currently being used and (ii) the amount of input power or input current received by the wireless power transmitter 220.

In stage (C), the electronic device 110 calculates and stores an efficiency measure for the combination of transmitter and receiver settings currently being used. For example, the processor 285 calculates the power transfer efficiency for the system 200 by dividing the input power to the wireless power transmitter 220 by the output power from the wireless power receiver 250. This is illustrated in the first row of table 295, showing that the processor 285 calculates the efficiency is 77.0% when using a voltage of 9V for $V_{IN}$ and $V_{OUT}$.

In stage (D), the electronic device 110 compares the most recent efficiency measure with a previous efficiency measure, such the efficiency measure for the immediately previous parameter adjustment cycle. However, for the initial parameter adjustment cycle, there is no previous cycle and efficiency measure to use for comparison. The first efficiency measure stored used as a baseline for comparisons with efficiency measures for later parameter adjustment cycles.

In stage (E), the electronic device 110 determines an adjusted set of operating parameters for the electronic device 110 and wireless charger 120. The electronic device 110 sends to the wireless charger 120 an indication of operating parameters for the wireless charger 120 that should change. For example, the electronic device 110 may increase the voltages $V_{IN}$ and $V_{OUT}$ by some incremental amount in order to achieve higher system-level efficiency for wireless power transfer. The processor 285 can determine a level of increment supported by the wireless charger 120 and the power supply 210, e.g., whether increments of 0.1V or 1.0V are permitted, what range of voltages are permitted, whether adjustment is limited to a specific set of voltages, etc.

In the example, the processor 285 determines that voltage increments of 0.1V are supported, so the processor 285 determines to increment the values of both voltages $V_{IN}$ and $V_{OUT}$ by this amount, from 9.0V to 9.1V. The processor 285 causes a message 296 to be set to the wireless charger 120, requesting the new voltage $V_{IN}$ of 9.1V. The wireless charger 120, in turn, communicates with the power supply 210 to adjust $V_{IN}$ to this level or to the closest voltage level supported. The processor 285 also causes the receiver power management circuit 270 to change the voltage $V_{OUT}$ used by the voltage regulator 280 to be 9.1V. In some implementations, the electronic device 110 may instruct other operating parameter changes to be made for the electronic device 110 and/or the wireless charger 120, such as to adjust the frequency for power transmission and thus the gain of the inductive coupling.

With the updated settings instructed in stage (E) applied, the operations of stages (A)-(E) are repeated to continue adjusting operating parameters of the electronic device 110 and/or the wireless charger 120 in an attempt to gradually or incrementally achieve higher efficiency. For example, several parameter adjustment cycles can be performed to discover the combination of operating parameters that achieves the highest efficiency or that achieves an efficiency of at least a minimum level. A new parameter adjustment cycle may be performed at a predetermined rate, such as every second, every 5 seconds, every 10 seconds, every 30 seconds, etc.

For example, in the second parameter adjustment cycle, the electronic device 110 repeats stage (A) to determine the output voltage $V_{OUT}$ and output power or current that are currently provided by the wireless power receiver 250. The electronic device 110 repeats stage (B) to determine the input voltage $V_{IN}$ and input power or current that are currently received by the wireless power transmitter 220 (e.g., through message 297). The electronic device 110 repeats stage (C) to determine and store a new efficiency measure for the current combination of settings, shown as 77.2%

When the electronic device 110 repeats stage (D), the processor 285 compares the most recent efficiency measure (e.g., 77.2%) to the previous efficiency measure (e.g., 77.0%), and determines whether the efficiency has increased. In this example, the efficiency has increased, and so increasing the values of voltages $V_{IN}$ and $V_{OUT}$ shows an increasing trend in efficiency. As long as the efficiency is increased or maintained, the electronic device 110 can continue to increase the voltage levels (or similarly adjust other operating parameters) in order to discover a more efficient operating point. Thus, the operating voltages can be stepped up periodically to reach a high efficiency operating point, potentially the highest efficiency operating point available. Once the comparison shows a decrease in efficiency, the electronic device 110 does not perform further voltage adjustment cycles. The current operating parameters or the parameters corresponding to the highest efficiency measure can be used for wireless power transfer going forward. In some implementations, the series of adjustment cycles may be stopped based on determining a decrease in average efficiency over multiple cycles, or a decrease in efficiency of at least a predetermined amount, to avoid being influenced by noise or slight inaccuracies in the measurements.

In response to determining that the efficiency has increased (e.g., from 77.0% to 77.2%), the electronic device 110 repeats stage (E) to determine an incrementally higher voltage for $V_{IN}$ and $V_{OUT}$. In the example, this new voltage level is 9.2V, and the processor 285 causes the voltage regulator 280 to increase $V_{OUT}$ to 9.2V. The processor 285 also sends a message 298 instructing the wireless charger 120 to increase the voltage $V_{IN}$ to 9.2V. After a predetermined amount of time has elapsed, e.g., 5 seconds, the electronic device 110 begins another parameter adjustment cycle.

The electronic device 110 repeats the operations of stages (A)-(E) to perform parameter adjustment cycles that incrementally increase the voltages $V_{IN}$ and $V_{OUT}$, and consequently incrementally increase the efficiency of power transfer. The electronic device 110 continues to perform parameter adjustment cycles that repeat the operations of stages (A)-(E), until the electronic device determines that efficiency begins to decrease.

In the illustrated example, once the values of $V_{IN}$ and $V_{OUT}$ reach 13.5V, the processor 285 determines that the efficiency of power transfer decreases compared to the previous set of operating parameters, e.g., an efficiency decrease from 80.5% to 80.3% by increasing voltage from 13.4V to 13.5V. In response to determining that efficiency has decreased, the processor 285 stops performing additional parameter adjustment cycles. The electronic device 110 can maintain the current settings for wireless charging. In some implementations, if desired, the processor 285 may look up the combination of operating parameters that provided the highest efficiency (e.g., voltage level of 13.4V) and instruct those operating parameters to be used.

In the example, the values of $V_{IN}$ and $V_{OUT}$ are the same for each adjustment step, but this is not required. Differing values of $V_{IN}$ and $V_{OUT}$ may be used and different adjustments to the values may be determined in an adjustment cycle.

In some implementations, the process of discovering an appropriate set of operating parameters may be restarted in response to detection of one or more events or conditions by the electronic device 110. For example, the processor 285 may periodically check efficiency, the level of $V_{OUT}$ achieved, the level of power demand by the electronic device 110 with respect to target levels. If one or more of these quantities changes by at least a predetermined amount, the electronic device 110 may perform parameter adjustment cycles to determine new parameters for wireless charging. For example, if the power demand changes significantly, the electronic device 110 may re-set the operating voltages to a lower level, and then incrementally increase the voltages over various parameter adjustment cycles until an appropriate operating point is found for the new power demand level.

In some implementations, the parameter adjustment cycles can be used to determine operating parameters other than voltages. For example, the frequency of power transfer can be incrementally adjusted upward or downward to evaluate efficiency at different frequencies. The transmissions of the wireless charger 120 and the receiver of the electronic device 110 can be adjusted or tuned for the different frequencies. A frequency providing high efficiency can be determined iteratively, by comparing efficiency measures for different settings, in the same manner done for adjustments to voltages.

Figure 3:
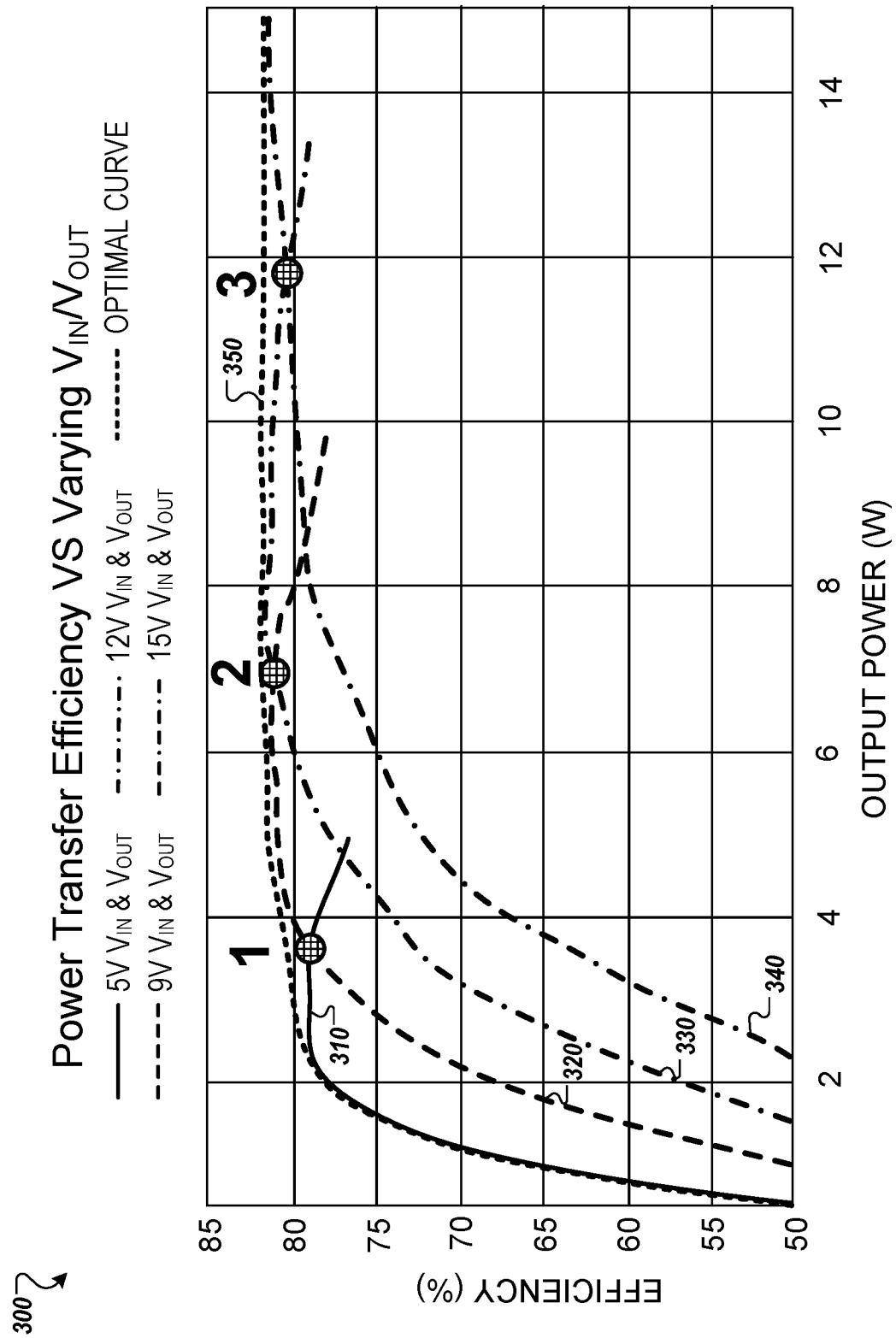
FIG. 3 is a chart that illustrates examples of power transfer efficiency curves.

FIG. 3 is a chart 300 that illustrates examples of power transfer efficiency curves. The chart 300 includes four curves that indicate wireless charging system power transfer efficiencies as functions of input voltage $V_{IN}$ and output voltage $V_{OUT}$. The horizontal axis of the chart 300 represents the charging power output in watts. The vertical axis of the chart 300 represents the efficiency of power transfer, which may be calculated by dividing the input power to the wireless power transmitter 220 by the output power of the wireless power receiver 250. The efficiency is expressed as a percentage.

In the example, the ratio of input voltage $V_{IN}$ to output voltage $V_{OUT}$ is set to be 1:1, which often yields high efficiency for charging. The chart 300 illustrates the wireless charging system power transfer efficiency at various input and output voltages. The curve 310 represents the efficiency with $V_{IN}$ and $V_{OUT}$ set at 5V. The curve 320 represents the efficiency with $V_{IN}$ and $V_{OUT}$ set at 9V. The curve 330 represents the efficiency with $V_{IN}$ and $V_{OUT}$ set at 12V. The curve 340 represents the efficiency with $V_{IN}$ and $V_{OUT}$ set at 15V.

Another curve 350 represents the optimal power transfer efficiency curve across the voltage range 5V to 15V. In other words, the curve 350 indicates the maximum efficiency achievable, for the range of output powers shown along the horizontal axis, by setting $V_{IN}$ and $V_{OUT}$ at any level from 5V to 15V. The curve 350 thus represents the highest-efficiency points taken from the aggregation of multiple curves having $V_{IN}$ and $V_{OUT}$ at different voltage levels.

For a given voltage level for $V_{IN}$ and $V_{OUT}$, e.g., along any of the individual curves 310, 320, 330, 340, the power transfer efficiency increases as the output power increases, up to a maximum point after which efficiency begins to decrease. For example, as shown with curve 310, when using voltages of 5V, the efficiency increases from 50% to 79% over the output power range from 0 W to roughly 2-3 W. Efficiency begins to decrease soon afterward.

The chart 300 includes three points that mark where efficiency curves intersect. At point 1, the 5V curve 310 intersects with the 9V curve 320, showing that at about 3.5 W of power output both voltage levels provide about the same efficiency. Below 3.5 W the 5V level provides greater efficiency, and above 3.5 W the 9V level provides greater efficiency. At point 2, the 9V curve 320 intersects the 12V curve 330 at about an output power of 7 W. Thus, from 3.5 W to 7 W the 9V level provides the highest efficiency, and above 7 W the 12V level provides greater efficiency.

At point 3, the 12V curve 330 intersects the 15V curve 340 at about an output power of 11.5 W. Thus, from 7 W to 11.5 W the 12V level provides the highest efficiency, and above 11.5 W the 15V level provides greater efficiency.

Aggregating the highest efficiency points from each of the curves 310, 320, 330, and 340, as well as for curves representing intermediate voltage levels, produces the curve 350, which represent the optimal power transfer efficiency curve. In other words, the curve 350 shows the highest system-level efficiency available for any of the different output power levels along the horizontal axis. The operations discussed in either of FIGS. 2B and 2C enable the system 200 to determine and set operating parameters that will cause power transfer operation to achieve efficiencies that track or at least approximate the values of the optimal efficiency curve.

For example, the charger profile 286 for the wireless charger 120 can include data indicating the relationships shown in the chart 300, such as data indicating the voltage levels for $V_{IN}$ and $V_{OUT}$ that provide the greatest efficiency for certain power output levels (e.g., for specific power output values or for ranges of power output values). For example, when power demand is 2 W, a value of 5V can be selected for $V_{IN}$ and $V_{OUT}$. On the other hand, when power demand is 5 W, a value of 9V can be selected for $V_{IN}$ and $V_{OUT}$. Thus, the operating voltages are set to provide the highest efficiency for the present level of power demand. The information in a charger profile 286 may be more fine-grained than is shown in the chart 300, for example, showing larger number of intermediate voltage levels than the four voltage levels illustrated (e.g., showing power output ranges that are best for 5V, 6V, 7V, 8V, etc. respectively provide the best efficiency). As another example, incrementally adjusting parameters as discussed with respect to FIG. 2C can achieve the same result of discovering a high efficiency operating point along the optimal curve 350 without a charger profile that specifies predetermined charger characteristics.

Figure 4:
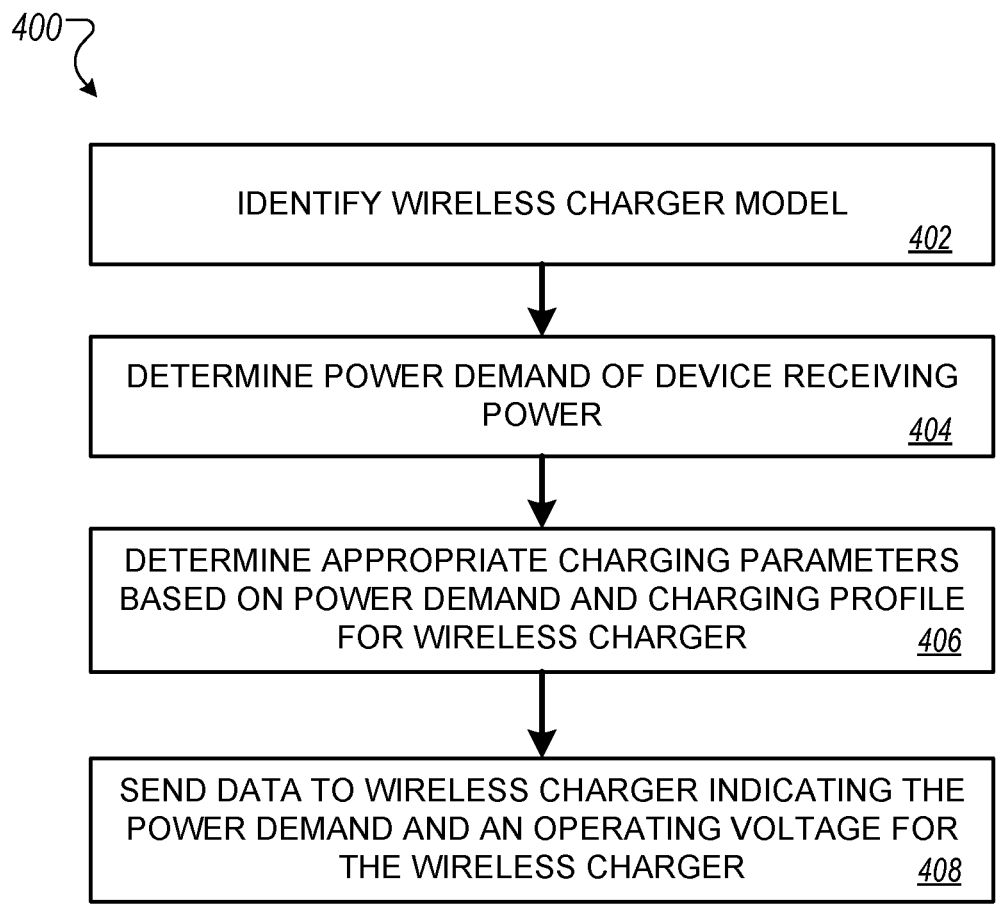
FIG. 4 is a flow chart that illustrates a method of setting parameters for wireless charging.

FIG. 4 is a flow chart that illustrates a method 400 of setting parameters for wireless charging. The method 400 can be used to determine operating parameters when the charger characteristics are known, for example, when the electronic device to be charged recognizes the type of charger being used and charger profile data for the charger is available. For example, the method 400 can include operations as described with respect to FIG. 2B. The method 400 may be performed by an electronic device to be charged or by another device.

In the method 400, the model or type of the wireless charger is identified (402). A level of power demand of the electronic device receiving power is determined (404). Charging parameters are determined based on the device power demand and a wireless charger profile (406). The charging parameters can include an input voltage $V_{IN}$ to a wireless power transmitter of the wireless charger. Data is sent to the wireless charger indicating the requested amount of power to be transmitted and an operating voltage, such as an input voltage $V_{IN}$ for the wireless charger (408).

Figure 5:
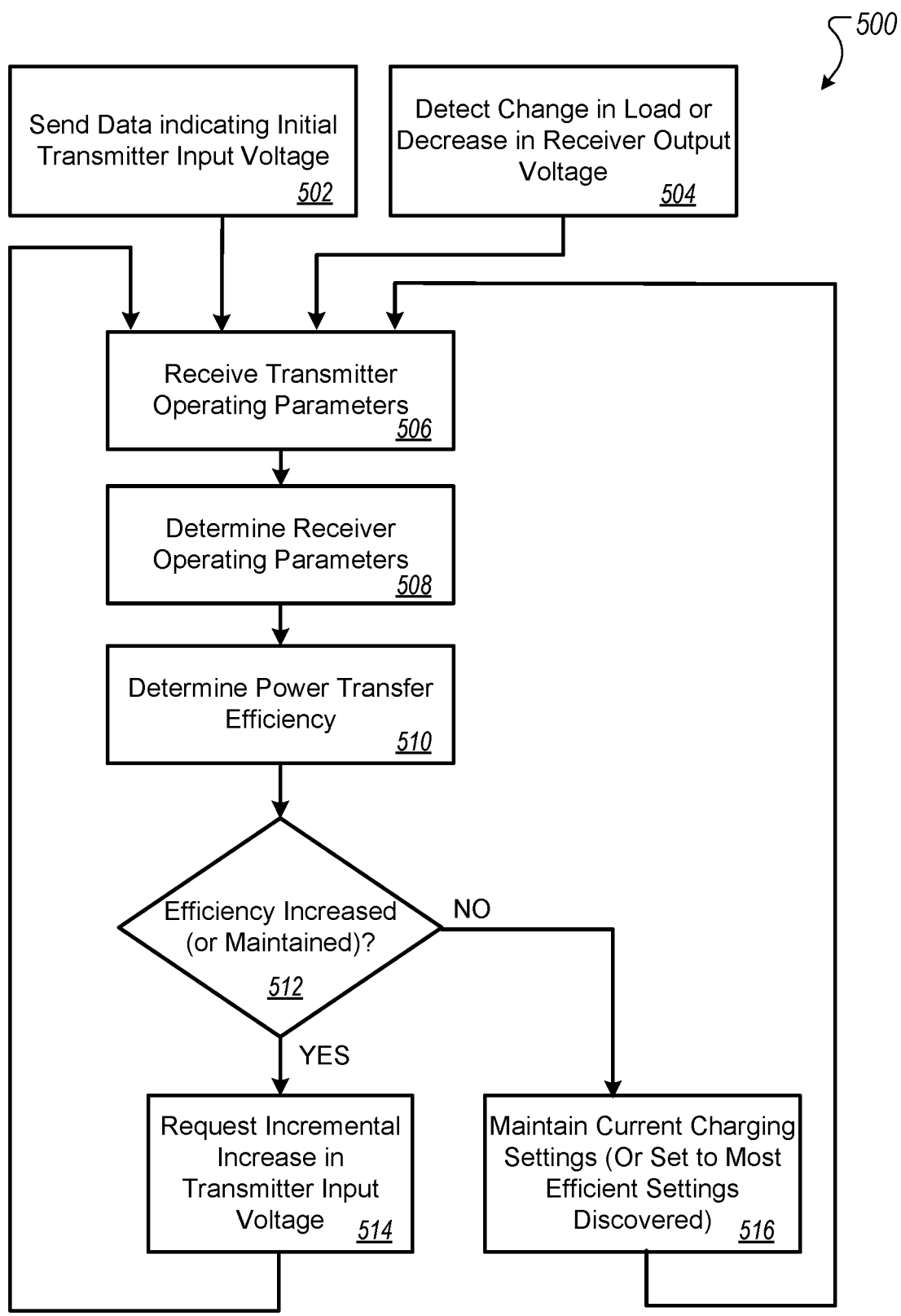
FIG. 5 is a flow chart that illustrates another method of setting parameters for wireless charging.

FIG. 5 is a flow chart that illustrates another method 500 of setting parameters for wireless charging. The method 500 can be used to determine operating parameters when the charger characteristics are unknown, for example, when the electronic device to be charged does not recognize the type of charger that being used or if appropriate charger profile data is not available. For example, the method 500 can include operations as described with respect to FIG. 2C. The method 400 may be performed by an electronic device to be charged or by another device.

The electronic device communicates with the wireless charger and sends data indicating initial transmitter input voltage to the wireless transmitter (502). The data includes, for example, an initial or default input voltage for a wireless power transmitter of the wireless charger.

As wireless charging proceeds, the electronic device receives data indicating transmitter operating parameters, for example, an indication of the input voltage $V_{IN}$ and input power or current used by the wireless power transmitter (506).

The electronic device determines receiver operating parameters, for example, an output voltage $V_{OUT}$ for a wireless power receiver include output power and output voltage (508).

The electronic device records the transmitter operating parameters and receiver operating parameters. The wireless charging system power transfer efficiency is further calculated and stored in the electronic device (510).

In step (512), the electronic device determines if the wireless charging system power transfer efficiency is increased or maintained, as compare to that of the previous round charging operations.

If the power transfer efficiency is determined to have increased (or at least to have been maintained), the electronic device sends request to the wireless charger to incrementally increase the input voltage further charging (514). Along with this change, the electronic device may update the receiver operating parameters, for example, to make a corresponding increase in the receiver output voltage. In other words, if the transmitter input voltage is increased 100 mV the receiver output voltage may also be increased 100 mV. The method 500 then proceeds by returning to step 506.

If the power transfer efficiency is determined to have decreased, the electronic device sends request to wireless charger to maintain the current charging settings (516). Optionally, the operating parameters can be changed to the set of parameters that provided the highest efficiency over various iterations of steps 506 to 514.

After step 516, FIG. 5 shows a connection back to step 506, representing that the process can optionally repeat parameter adjustment steps even after a set of efficient settings has been found. The electronic device can repeatedly measure the efficiency to verify that operation at an efficient level is being maintained, e.g., to keep checking that efficiency is appropriate and adjust if the efficiency changes. Over time, fluctuations in load, changes in positioning of the device with respect to the charger, and other factors may alter the coupling of the electronic device and charger. After a certain period of time has passed, the electronic device can again determine transmitter and receiver operating parameters (steps 506 and 508) and determine power transfer efficiency (step 510). Although the operating parameters may not have changed, the efficiency may be higher or lower than when the current settings were originally selected. Thus, new conditions may result in further incremental increases in parameters, such as transmitter input voltage (514) and corresponding receiver output voltage, and the setting of a second set of efficient parameters at some point after a first set of efficient parameters was selected.

In some implementations, after setting efficient parameters in step 516, the system may determine that the efficiency of using the current operating parameters has decreased, and in response the system can reduce transmitter input voltage and receiver output voltage. This decrease may be performed incrementally, or by a larger step that has a magnitude of multiple increments (e.g., decreasing by 1V or 2V when voltage increments are 100 mV). With this approach, if the charging conditions have changed so the operating voltages are significantly higher than the most efficient level, the electronic device can bring the voltages down and then gradually increment back up to the level that would be most efficient. As another approach, upon determining that efficiency has decreased and that incremental voltage increases further decrease efficiency, the electronic device can incrementally decrease voltages of the transmitter and receiver, in which is roughly the opposite of step 514. Voltages or other parameters can be incrementally decreased until reaching the peak efficiency level where efficiency begins to decrease, and the efficient settings determined using the series of efficiency measurements.

In some implementations, the electronic device may repeat the cycle of adjusting and evaluating operating parameters in response to detecting a condition, such as a change in power demand of the electronic device or a decrease in the output voltage of a wireless power receiver of the electronic device (504). If one of these conditions is detected, the method 500 may continue with step 506.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method comprising:
   determining, by an electronic device, a power demand of the electronic device, wherein the electronic device includes a wireless power receiver including a wireless power receiving coil configured to receive power through inductive coupling with a wireless charger;
   receiving, by the electronic device and from the wireless charger, data that identifies a type of the wireless charger;
   selecting, by the electronic device and based on the data that identifies the type of the wireless charger, a selected set of charger profile data that corresponds to the wireless charger from among multiple different sets of charger profile data, wherein each set of charger profile data of the multiple different sets of charger profile data indicates characteristics of a respective type of wireless charger from among multiple different types of wireless chargers, the selected set of charger profile data indicating an operating voltage or operating frequency for the wireless charger to use for each of multiple different power demands of the electronic device;
   determining, by the electronic device based on information in the selected set of charger profile data, a selected operating voltage or operating frequency that corresponds to the power demand of the electronic device in the selected set of charger profile data; and
   sending, by the electronic device and to the wireless charger, data indicating the selected operating voltage or operating frequency to cause the wireless charger to transmit power to the electronic device using the selected operating voltage or operating frequency.

2. The method of claim 1, comprising:
   determining, based on the power demand of the electronic device, an operating voltage or operating frequency for the wireless power receiver of the electronic device; and
   setting the wireless power receiver to use the determined operating voltage or operating frequency for the wireless power receiver of the electronic device.

3. The method of claim 2, wherein determining the selected operating voltage or operating frequency for the wireless charger comprises determining a selected operating voltage for the wireless charger;
   wherein the selected operating voltage for the wireless charger is an input voltage provided to a wireless power transmitter of the wireless charger;
   wherein determining the operating voltage or operating frequency for the wireless power receiver comprises determining an operating voltage for the wireless power receiver; and wherein the operating voltage for the wireless power receiver is an output voltage of the wireless power receiver of the electronic device.

4. The method of claim 1, wherein determining the selected operating voltage or operating frequency comprises determining a selected operating voltage for the wireless charger; and
wherein the selected operating voltage for the wireless charger is a voltage that a driver circuit of the wireless charger uses to generate excitation pulses that drive a power transmission coil of the wireless charger.

5. The method of claim 1, comprising sending, by the electronic device, data indicating the power demand of the electronic device to the wireless charger.

6. The method of claim 1, wherein determining the power demand comprises:
determining a first amount of power for operation of the electronic device; and
determining a second amount of power for charging of a battery of the electronic device;
wherein the power demand is a combination of the first amount of power and the second amount of power.

7. The method of claim 1, wherein the electronic device is configured to communicate with the wireless charger by sending data over an inductive coupling used to provide power from the wireless charger to the electronic device.

8. The method of claim 1, wherein the selected set of charger profile data comprises a data model, a table, a mapping, an equation, or data for one or more curves.

9. The method of claim 1, wherein the selected set of charger profile data indicates an efficiency envelope across multiple wireless charging power levels; and
wherein determining the selected operating voltage or operating frequency for the wireless charger comprises determining, based on the selected set of charger profile data, the selected operating voltage or operating frequency to achieve an efficiency along the efficiency envelope indicated by the charger profile data.

10. The method of claim 1, wherein determining the selected operating voltage or operating frequency comprises determining a selected operating voltage for the wireless charger; and
wherein determining the selected operating voltage comprises determining an operating voltage such that the selected operating voltage of the wireless charger and an operating voltage of a wireless power receiver of the electronic device have a ratio that is a predetermined value or within a predetermined range.

11. The method of claim 10, wherein the ratio is between 1:1 to 1.2:1.

12. The method of claim 1, comprising:
determining that the power demand of the electronic device has changed or that a predetermined amount of time has elapsed; and
in response to determining that the power demand of the electronic device has changed or that the predetermined amount of time has elapsed, determining a second selected operating voltage or operating frequency for the wireless charger and causing the electronic device to send, to the wireless charger, data indicating the second selected operating voltage or operating frequency.

13. The method of claim 1, comprising, after sending the data indicating the selected operating voltage or operating frequency to the wireless charger:
performing one or more operating voltage adjustment cycles that each comprise:

receiving, from the wireless charger, data indicating one or more operating settings of the wireless charger;
determining, based on the data indicating one or more operating settings of the wireless charger, an efficiency measure for power transfer between the wireless charger and the electronic device using a first operating voltage of the wireless charger;
determining that the efficiency measure indicates a higher efficiency than a previously determined efficiency measure for operation of the wireless charger with an operating voltage lower than the first operating voltage; and
based on determining that the efficiency measure indicates a higher efficiency than the previously determined efficiency measure, causing the electronic device to send, to the wireless charger, data indicating an operating voltage that is higher than the first operating voltage.

14. The method of claim 13, wherein performing the one or more voltage adjustment cycles is performed in response to determining that the wireless charger is not identified by the electronic device or that a set of charger profile data for the wireless charger is not available to the electronic device.

15. The method of claim 13, comprising periodically performing the voltage adjustment cycles until determining that an efficiency measure for operating the wireless charger at a current operating voltage indicates an efficiency that is lower than the efficiency indicated by the efficiency measure for operating the wireless charger at an operating voltage of a previous voltage adjustment cycle.

16. The method of claim 1, comprising:
iteratively adjusting the selected operating voltage or operating frequency for the wireless charger by performing adjustment cycles that each incrementally adjust the selected operating voltage or operating frequency used by the wireless charger, wherein the selected operating voltage or operating frequency is iteratively adjusted until the electronic device determines that an efficiency for power transfer between the wireless charger and the electronic device using a current operating voltage or operating frequency for the wireless charger is lower than an efficiency for power transfer between the wireless charger and the electronic device with a previous operating voltage or operating frequency for the wireless charger.

17. The method of claim 1, wherein:
the power demand of the electronic device comprises an amount of Watts used by the electronic device; and
determining the power demand of the electronic device comprises determining the amount of Watts used by the electronic device.

18. The method of claim 1, wherein:
the power demand of the electronic device comprises an energy usage over time for the electronic device; and
determining the power demand of the electronic device comprises determining the energy usage over time for the electronic device.

19. One or more non-transitory machine-readable storage devices storing instructions that, when executed by one or more processors of an electronic device, cause the electronic device to perform operations comprising:
determining, by the electronic device, a power demand of the electronic device, wherein the electronic device includes a wireless power receiver including a wireless power receiving coil configured to receive power through inductive coupling with a wireless charger;

receiving, by the electronic device and from the wireless charger, data that identifies a type of the wireless charger;

selecting, by the electronic device and based on the data that identifies the type of the wireless charger, a selected set of charger profile data that corresponds to the wireless charger from among multiple different sets of charger profile data, wherein each set of charger profile data of the multiple different sets of charger profile data indicates characteristics of a respective type of wireless charger from among multiple different types of wireless chargers, the selected set of charger profile data indicating an operating voltage or operating frequency for the wireless charger to use for each of multiple different power demands of the electronic device;

determining, by the electronic device based on information in the selected set of charger profile data, a selected operating voltage or operating frequency that corresponds to the power demand of the electronic device in the selected set of charger profile data; and sending, by the electronic device and to the wireless charger, data indicating the selected operating voltage or operating frequency to cause the wireless charger to transmit power to the electronic device using the selected operating voltage or operating frequency.

20. An electronic device comprising:

a wireless power receiver including a wireless power receiving coil configured to receive power through inductive coupling with a wireless charger; and one or more processors configured to perform operations comprising:

determining, by the electronic device, a power demand of the electronic device;

receiving, by the electronic device and from the wireless charger, data that identifies a type of the wireless charger;

selecting, by the electronic device and based on the data that identifies the type of the wireless charger, a selected set of charger profile data that corresponds to the wireless charger from among multiple different sets of charger profile data, wherein each set of charger profile data of the multiple different sets of charger profile data indicates characteristics of a respective type of wireless charger from among multiple different types of wireless chargers, the selected set of charger profile data indicating an operating voltage or operating frequency for the wireless charger to use for each of multiple different power demands of the electronic device;

determining, by the electronic device based on information in the selected set of charger profile data, a selected operating voltage or operating frequency that corresponds to the power demand of the electronic device in the selected set of charger profile data; and sending, by the electronic device and to the wireless charger, data indicating the selected operating voltage or operating frequency to cause the wireless charger to transmit power to the electronic device using the selected operating voltage or operating frequency.

* * * * *